United States Patent Office 3,842,162
Patented Oct. 15, 1974

3,842,162
PROCESS FOR THE PRODUCTION OF
NITRONIUM PERCHLORATE
Edward A. Fishkin, New York, N.Y., and Harry W. Wilson, Valencia, Pa., assignors to Mine Safety Appliances Company, Pittsburgh, Pa.
No Drawing. Filed Oct. 30, 1963, Ser. No. 320,608
Int. Cl. C01b 21/52
U.S. Cl. 423—386                                 2 Claims This invention relates to a new and improved method for the production of nitronium perchlorate, $NO_2ClO_4$, in exceptionally high yield.

Nitronium perchlorate has been the object of considerable attention in recent years due to the high content of available oxygen per unit weight and because of its good stability. This material is the reaction product of three relatively expensive materials, nitrogen dioxide, chlorine dioxide and ozone which react according to the following overall equation:

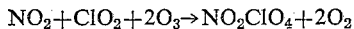

$$NO_2 + ClO_2 + 2O_3 \rightarrow NO_2ClO_4 + 2O_2$$

A general process for the preparation of this material in a Venturi tube reactor is described in R. A. Brown et al., Ser. No. 38,074, filed June 22, 1960, now Pat. No. 3,186,-790, under common ownership with the invention herewith. Although that invention represented a substantial improvement over existing processes, nevertheless good yields based on chlorine dioxide were not obtainable prior to the invention described herein. We have discovered that the reaction can be conducted in a Venturi tube reactor as described in the Brown et al. application with better than 90% yield based on nitrogen dioxide and chlorine dioxide by the proper combination of a number of critical process variables.

The prime object of this invention is to provide a new and improved process for producing nitronium perchlorate in a Venturi tube reactor which produces nitronium perchlorate in high yields and in high purity.

Other objects will become apparent from the following specification and claims.

Ozone decomposes to oxygen with increasing rapidity as the temperature increases and this decomposition is catalyzed by many materials including the oxides of nitrogen which are produced along with ozone by the electric discharge in air method for the production of ozone. Chlorine dioxide is a very unstable compound being spontaneously decomposable at room temperature in the pure state. For this reason it is necessary to use chlorine dioxide in diluted form in a concentration less than 15% $ClO_2$ with an inert gas. Since critical concentrations and temperatures have not been conclusively established, it is prudent to consider $ClO_2$ as a dangerous substance because of this chemical instability. Even in this diluted form it decomposes under increasing temperatures, and this decomposition is catalyzed by many commonly occurring substances such as dust, lubricants, organic contaminants as well as dirt and pipe scale. Therefore, even in the prior process of Brown et al. which was carried out at room temperature, great caution was exercised because of the instability of these two constituents. We have now discovered that extremely high yields may be obtained by conducting the reaction at an elevated temperature of very restricted range contrary to the prior expectations. Furthermore we have discovered that the elevated temperature may be conveniently attained by heating the ozone stream prior to introduction into the reactor without the negative temperature characteristics of ozone becoming a factor of any significance. Specifically, we have discovered that nitronium perchlorate may be produced in very high yields if the reaction is conducted at a temperature between about 55° C. and 75° C. and that exceptionally high yields of better than 90% with respect to chlorine dioxide and nitrogen dioxide may be obtained at about 70° C.

In the prior Venturi tube reaction conducted at room temperature it was recognized that very high yields with respect to all three reactants were not obtainable and that a substantial excess of chlorine dioxide was necessary in order to obtain high yields with regard to the other two reactants. However, chlorine dioxide is a very expensive reactant being more expensive than nitrogen dioxide by several orders of magnitude. We have made the very striking and unique discovery that the highest yields are obtained at the critical temperatures described herein at substantially a stoichiometric feed of all three reactants. Thus, by this invention we approach the ultimate; that is, 100% yield with respect to all reactants utilizing a stoichiometric feed. The reason for this unexpectedly high yield at elevated temperatures is not understood since it appears to be contrary to the expected result from heating due to the temperature instability of ozone and chlorine dioxide as well as the product nitronium perchlorate. Furthermore, we have discovered that unexpectedly the point of maximum yield approaches a stoichiometric feed of chlorine dioxide and nitrogen dioxide as temperature increases. The reason for this is not understood and temperature dependence of this feed ratio is unexpected.

Although the prior Venturi tube reactor process specified that the ozone must be fed to the Venturi tube separately from the other reactants, it was not of critical significance whether the chlorine dioxide and nitrogen dioxide were added separately or together. We have furthermore discovered that it is essential in order to obtain these high yields at the elevated temperature that the chlorine dioxide and nitrogen dioxide be intermixed as a single stream prior to introduction to the Venturi tube reactor in order to achieve the high yields. If these two reactants are added separately to the Venturi tube reactor, the resulting yield is substantially lessened. This is a surprising result because of the existence of competing reactions involving chlorine dioxide and nitrogen dioxide with an ultimate loss of these reactants. We have discovered that the ratio of chlorine dioxide to nitrogen dioxide for high yield is critical while the ratio of either of these reactants with regard to ozone is of less significance with regard to yield.

Thus we have discovered to obtain these exceptionally high yields that the temperature of operation is critical, that there exists a critical molar ratio of chlorine dioxide and nitrogen dioxide, and that a critical feed of reactants, that is chlorine dioxide and nitrogen dioxide being intermixed prior to reaction, is necessitated in order to get the high yields. We have discovered that very high yields are obtainable if the temperature of operation of the reaction is maintained between 55° C. and 75° C. with a molar ratio of chlorine dioxide to nitrogen dioxide ranging between 1.0 and 1.3. Exceptionally high yields of better than 90% are obtained if the reaction is conducted at about 70° C. and a molar ratio of chlorine dioxide to nitrogen dioxide of about 1.1. According to this invention the ozone is fed approximately in stoichiometric proportions and the chlorine dioxide and nitrogen dioxide are added together as a stream to the reactor for reaction with the separately introduced ozone.

The ozone may be prepared by a suitable electrical discharge in oxygen or air. In all instances herein ozone was produced in air by an electric discharge in air resulting in a concentration of uniform consistency throughout of 1% ozone in air. By the use of pure oxygen high concentrations of ozone are attainable, however, oxygen free of chlorine dioxide must be recovered from the product gas to make this process economical. Varying concentrations of ozone in air or oxygen may be obtained by utilization of well known principles and different electric discharge systems as is well known in the art. In view of the great dilution of ozone in the air stream, the volume of air and ozone introduced into the reactor is greater than ten times the total volume of the other reactants after dilution.

In these reactions chlorine dioxide was prepared by passing a stream of chlorine gas diluted in nitrogen as an inert carrier gas through a bed of sodium chlorite. These react to produce chlorine dioxide and sodium chloride in substantially quantitative yields. The volume of nitrogen used throughout this work was such as would provide a concentration of 8% chlorine dioxide in the nitrogen. Many other processes are available for making chlorine dioxide in good yield.

Pure nitrogen dioxide was introduced into the stream of chlorine dioxide and inert gas prior to introduction into the reactor. Why these two reactants must be introduced together as a stream to get high yields at the elevated temperature is not understood and no theoretical basis has been forthcoming for the high yields produced by this technique, particularly in view of the fact that it was discovered that somewhat better yields are obtained at room temperature with a separate feed of these two reactants. Even utilizing the utmost caution in this work several explosions involving chlorine dioxide at room temperature were experienced. The admonition of the workers in the art to use prudence with chlorine dioxide was substantiated.

The stream of ozone-air was heated to the desired temperature immediately prior to introduction into the Venturi reactor without significant decomposition of the ozone. The mixed stream of chlorine dioxide and nitrogen dioxide in the inert gas was introduced into the throat of the reactor. Because of the great volume of heated ozone-air as compared with the small volume of the other reactant gases, the temperature of the reactants as they were mixed was substantially that of the air-ozone mixture as it was introduced into the reactor. The reaction immediately proceeds upon introduction of the two reactant streams and continues for several seconds as the reactant gases are conveyed from the Venturi reactor to a bag-type dust collector. It is essential in conducting this reaction that every trace of moisture be excluded from both streams entering the reactor and also from the product because of the extreme sensitivity of the product, nitronium perchlorate, to moisture of any kind. The following tables are representative of a large number of runs carried out in demonstration of the invention. In these experiments the feed of ozone was approximately stoichiometric. The ozone-air mixture was fed into the mouth of the Venturi tube while the diluted, mixed oxides were fed into the throat of the reactor through a tap in the reactor sidewall. The yield of nitronium perchlorate as measured against the ozone fed was found to be as high as 85% yield and did not seem to evidence any substantial concentration dependence with respect to the other two reactants.

TABLE 1

| Feed ratio | Percent yield at— | | | | | | | |
|---|---|---|---|---|---|---|---|---|
| | 70° C. | | 65° C. | | 55° C. | | 33° C. | |
| | $ClO_2$ | $NO_2$ | $ClO_2$ | $NO_2$ | $ClO_2$ | $NO_2$ | $ClO_2$ | $NO_2$ |
| .9 | 44 | ------- | 74 | 64 | ------- | ------- | 52 | 42 |
| 1.0 | 73 | 58 | 77 | 71.5 | 63 | 59 | 57 | 50 |
| 1.1 | 95 | 94 | 78 | 79 | 71 | 72 | 61 | 60 |
| 1.2 | 90 | 92.5 | 77.5 | 84 | 74 | 81 | 63 | 67 |
| 1.3 | 80 | 88 | 77 | 88 | 75 | 88 | 64 | 74 |
| 1.4 | 71 | 84 | 75 | 92 | 75 | 94 | 64 | 79 |
| 1.5 | 62 | 79 | 73 | 95 | 74 | 98 | 63 | 82.5 |

NOTE.—Feed ratio=mols $ClO_2$/mols $NO_2$.

From this table it is instantly observed that exceptionally high yields of nitronium perchlorate are obtainable with respect to all reactants at 70° C. It can be seen that within the range of conditions of operation of our invention very high yields are also obtainable. It is a very significant aspect of our invention that as the optimum temperature is approached i.e. 70° C., the peak yield with respect to both chlorine dioxide and nitrogen dioxide approaches the stoichiometric feed ratio—an unexpected advantage of the higher temperatures.

In Table 2 the yield of nitronium perchlorate at 70° C. using a mixed feed of chlorine dioxide and nitrogen dioxide is compared with a separate feed of these two reactants to the reactor.

TABLE 2

| Feed ratio | Percent yield based on— | | | |
|---|---|---|---|---|
| | $ClO_2$ | | $NO_2$ | |
| | Mixed feed | Separate feed | Mixed feed | Separate feed |
| .9 | 44 | 62 | ------- | 53 |
| 1.0 | 73 | 67 | 58 | 62 |
| 1.1 | 95 | 71 | 94 | 71 |
| 1.2 | 90 | 73 | 92.5 | 80 |
| 1.3 | 80 | 75 | 88 | 88 |
| 1.4 | 71 | 74 | 84 | 91 |
| 1.5 | 62 | 71 | 79 | 90 |

NOTE.—Feed ratio=mols $ClO_2$/mols $NO_2$; temperature=70° C.

It is seen in this comparison table that there is a striking improvement in yield when using a mixed feed as compared with a separate feed based on $ClO_2$ and a somewhat greater improvement based upon $NO_2$ feed. Furthermore, the maximum yield in both instances is near stoichiometric feeds for the mixed feed technique. This demonstrates that in addition to the use of an elevated temperature for the reaction to nitronium perchlorate that optimum yields at the elevated temperatures require the use of a mixed oxide feed to the reactor.

The source of the chlorine dioxide is not material provided that it is moisture free and that contaminants are kept to a minimum in order to reduce the hazard. Nitrogen was used by us as the inert carrier gas for the chlorine dioxide, however, any suitable gas such as dried air or helium which is inert to the reactants and products may be used.

Since both chlorine dioxide and nitrogen dioxide catalyze the decomposition of ozone to oxygen with this catalysis reaction increasing in rapidity at elevated temperatures, it heretofore was considered necessary to operate the reaction at low temperatures, i.e., ambient conditions for best results. For some reason, not understood, when operating at an elevated temperature, i.e. 70° C., and near stoichiometric feed there does not seem to be any substantial decomposition of the ozone by the chlorine dioxide and the nitrogen dioxide. However, these ozone destroying reactions are much more rapid and of significance at elevated temperatures with feed ratios removed from the stoichiometric as compared with room temperature operation. That means that not only is the yield curve with respect to chlorine dioxide and nitrogen dioxide much higher but it is also much sharper, falling off very quickly when moving away from stoichiometric feed than is the case with room temperature operation. This requires a closer control of the feed ratio under our invention for best results as seen in Tables 1 and 2.

According to the provisions of the patent statutes, we have explained the principle and mode of practicing our invention and have described what we now consider to be its best embodiments. However, we desire to have it understood that, within the scope of the appended claims, the invention may be practiced otherwise than as specifically described.

We claim:

1. A method of producing nitronium perchlorate, $NO_2ClO_4$, in a Venturi tube reactor which comprises continuously introducing and intermixing in the throat of a Venturi tube reactor a first stream of ozone entrained in an inert carrier gas and a separate stream of nitrogen dioxide and chlorine dioxide entrained in a second inert carrier gas having a molar ratio of chlorine dioxide to nitrogen dioxide of from about 1.0 to about 1.3, whereby said ozone, nitrogen dioxide and chlorine dioxide react to produce solid nitronium perchlorate entrained in the gas stream leaving said reactor, said first ozone-containing stream being heated prior to introduction to the reactor to a temperature sufficient to produce a resultant temperature of between about 55° C. to about 75° C. in the intermixture of the two said gas streams introduced into the reactor.

2. A method according to claim 1 in which the molar ratio of chlorine dioxide to nitrogen dioxide is about 1.1 and the said temperature in the reactor is about 70° C.

References Cited

UNITED STATES PATENTS

| | | | |
|---|---|---|---|
| 3,186,790 | 6/1965 | Brown et al. | 423—386 |
| 3,558,456 | 1/1971 | Lakritz et al. | 423—386 |

BENJAMIN R. PADGETT, Primary Examiner

B. H. HUNT, Assistant Examiner

U.S. Cl. X.R.

423—476